United States Patent [19]

Williams et al.

[11] 4,387,186
[45] Jun. 7, 1983

[54] WATER SWELLABLE POLYMERS

[75] Inventors: Earl P. Williams, Pen Argyl, Pa.; Donald H. Lorenz, Basking Ridge, N.J.

[73] Assignee: GAF Corporation, New York, N.Y.

[21] Appl. No.: 278,278

[22] Filed: Jun. 29, 1981

[51] Int. Cl.³ .............................................. C08F 8/44
[52] U.S. Cl. .................................. 525/327.8; 526/271
[58] Field of Search .............. 526/271; 525/369, 327.8

[56] References Cited

U.S. PATENT DOCUMENTS 3,448,088  6/1969  Azorlosa .............................. 526/271
3,514,419  5/1970  Darlow et al. ....................... 526/271

Primary Examiner—Paul R. Michl
Attorney, Agent, or Firm—Joshua J. Ward; J. Gary Mohr; Marilyn J. Maue

[57] ABSTRACT

Water swellable monovalent alkali metal salt of cross-linked interpolymer of maleic anhydride, monovinyl alkyl ether and 1–5 mole percent crosslinking agent comprising divinyl ether of aliphatic diol.

9 Claims, No Drawings

WATER SWELLABLE POLYMERS

BACKGROUND OF THE INVENTION

Crosslinked polymers which are insoluble in water, but are capable of absorbing large amounts of water are known in the art and are used for instance in disposable diapers, sanitary napkins and tampons as well as being used as horticultural and agricultural aids. U.S. Pats. Nos. 3,997,484, 3,669,103 and 3,670,731 for instance describe such polymers and their uses.

U.S. Pat. No. 3,448,088 describes water soluble crosslinked interpolymers which are useful as viscosity improvers.

SUMMARY OF THE INVENTION

It is an object of the present invention to provide water swellable compositions useful for absorbing large amounts of aqueous fluids.

Water swellable compositions of the invention consist essentially of monovalent alkali metal salts of crosslinked interpolymers consisting essentially of substantially equimolar quantities of maleic anhydride and monovinyl alkyl ether wherein the alkyl group contains from 1 to 4 carbon atoms and from about 1 to about 5 mole percent based on the monovinyl alkyl ether of a crosslinking agent having the formula selected from the class consisting of:

$$H_2C=CH-O-X_1-OCH=CH_2$$

and $$H_2C=CH_2-(OX_2)_n-OCH=CH_2$$

where $X_1$ represents an alkylene group of two to twelve carbon atoms and $X_2$ represents an alkylene group of two to four carbon atoms and n represents an integer of 2 to 100.

DETAILED DESCRIPTION OF THE INVENTION

As mentioned above, the interpolymers described in U.S. Pat. No. 3,448,088 are water soluble and useful as viscosity improvers. The water swellable compositions of the present invention are alkali metal salts of crosslinked interpolymers which are essentially the same as the interpolymers described in U.S. Pat. No. 3,448,088. The materials of the present invention are, however, water swellable without being water soluble. This enables compositions of the invention to absorb and retain unusually large quantities of aqueous fluids as swollen gel particles. Compositions of the invention have utility in various applications where super absorbency is desired, such as in diapers, sanitary napkins, tampons, adult incontinent products and as horticultural and agricultural aids. On contact with water the polymeric particles of compositions of the invention swell and absorb water rapidly until saturated. Saturation level or fluid absorbency varies with water characteristics such as hardness, ionic strength and pH; however, fluid absorption capacity is significant even with adverse conditions such as high ionic content water.

In preparing compositions of the invention, anhydride interpolymer is first prepared and then reacted with a monovalent base of an alkali metal to form the desired monovalent alkali metal salt. Potassium and sodium are preferred alkali meals for this purpose, although other alkali metals may be used. Preferred alkali metal bases are hydroxides, especially potassium hydroxide or sodium hydroxide, but other monovalent bases such as lithium hydroxide and cesium hydroxide may be used.

In the preparation of the parent anhydride interpolymer of this invention, any of the monovinyl alkyl ethers or mixtures of these containing from 1 to 18 carbon atoms in the alkyl moiety may be utilized, providing that the amount of admixed vinyl ether of greater than 3 alkyl carbon atoms is less than 10 mole percent of the total vinyl ether content. It is preferred, however, to utilize the lower alkyl vinyl ethers such as methyl vinyl ether, ethyl vinyl ether, or isopropyl vinyl ether. Of these, methyl vinyl ether is much preferred. Among other monovinyl ethers that may be mentioned are propyl vinyl ether, butyl vinyl ether, isobutyl vinyl ether, hexyl vinyl ether, octyl vinyl ether, decyl vinyl ether, dodecyl vinyl ether, hexadecyl vinyl ether and octadecyl vinyl ether.

The crosslinking agent is a divinyl ether of an aliphatic diol and selected from the class consisting of:

$$H_2C=CH-O-X_1-OCH=CH_2$$

and $$H_2C=CH-(OX_2)_n-OCH=CH_2$$

wherein X represents an alkylene group of from 2 to 12 carbon atoms, preferably from 2 to 6 carbon atoms and wherein $X_2$ represents an alkylene group of from 2 to 4 carbon atoms and wherein n represents an integer from 2 to 100, preferably from 2 to 4.

The polymerization is carried out conveniently by preparing a solvent solution of the monomers and adding a catalytic amount (preferably from 0.001 to 1.0%) of an organic free-radical-generating initiator. The resulting solution is mixed thoroughly and heated sufficiently so that the polymerization reaction takes place. At the completion of the polymerization reaction, the precipitated interpolymer is isolated by any suitable means such as by filtration or distillation of solvent, then washed with fresh solvent and vacuum dried. Moreover, the polymerization may also be conducted by adding a solution of the vinyl ether to a solution of initiator, maleic anhydride and solvent, or by adding a solution of divinyl ether to a solution of maleic anhydride, monovinyl ether, solvent and initiator.

The amount of solvent is not critical and such solvents as benzene, toluene, xylene, acetone, methyl ethyl ketone, methylene chloride and if so desired, even an excess of the alkyl vinyl ether employed may be added as solvent since the polymer formed consists of equimolar alternating units of vinyl ether and maleic anhydride. Benzene or methyl vinyl ether are considered the most suitable from the standpoint of product isolation and obtaining high molecular weights.

Among the organic free-radical-generating initiators that may be mentioned are azobisisobutyronitrile, benzoyl peroxide, lauroyl peroxide, caprylyl peroxide, acetyl peroxide, acetyl benzoyl peroxide, di-tert-butyl peroxide, azobis(2,4-dimethyl-valeronitrile) and the like. Mixtures of such catalysts are also suitable in the process of making the interpolymers of the invention. Radiation polymerization can be used too, e.g. such high energy radiation sources as ultraviolet light, x-rays, gamma-rays, neutrons and the like can be used to initiate polymerization.

The polymerization may be carried out at a temperature within the range of 0° to 150° C. Preferred temperatures are, for the most part, in the range from 50° to 100° C., particularly about 60°–80° C.

As mentioned the amount of crosslinking agent used may vary from about 1 to about 5 mole percent based on monovinyl alkyl ether. Examples of the divinyl ethers of an aliphatic diol that may be mentioned as crosslinking agents are the divinyl ethers of 1,2-ethanediol; 1,3-propanediol; 1,4-butanediol; 1,5-pentanediol; 1,6-hexanediol; 1,7-heptanediol; 1,8-octanediol; 1,9-nonanediol; 1,10-decanediol; 1,11-unidecanediol; and 1,12-dodecanediol, as well as the divinyl ethers of diethylene glycol, triethylene glycol, tetraethylene glycol, pentaethylene glycol; hexaethylene glycol, heptaethylene glycol, octaethylene glycol, nonethylene glycol, decaethylene glycol and further polyalkylene glycols up to a molecular weight of about 5900.

The following Examples are intended to illustrate the invention without limiting the scope thereof.

EXAMPLE 1

An interpolymer was prepared from the following ingredients:
 1854 grams (18.9 moles) maleic anhydride
 1374 grams (23.6 moles) methyl vinyl ether
 114 grams (0.8 moles) butanediol divinyl ether
 3 grams lauroyl peroxide
 21,400 grams benzene

Procedure

The maleic anhydride was dissolved in 5000 mls benzene and filtered to remove traces of maleic acid and the solution charged to a 10 gallon reactor. An additional 19,300 mls of benzene, 2 grams lauroyl peroxide dissolved in 50 ml benzene and 12 grams butanediol divinylether were also added to the reactor. Air in the reactor was removed by pulling vacuum and releasing with nitrogen three times, then the vacuum was released with a slight positive nitrogen pressure. 134 grams methyl vinyl ether was then charged from a cylinder and the reaction mixture heated to 70° C.

A mixture of 1240 grams methyl vinyl ether and 102 grams butanediol divinylether was then added over a period of 2 hours at 70° C., then held an additional 2 hours at 70° C.

1 gram lauroyl peroxide dissolved in 50 mls benzene was then added and held an additional 2 hours at 70° C.

The reaction mixture was then cooled to room temperature and filtered and dried. A test for unreacted maleic anhydride using triphenyl phosphine showed that all maleic anhydride had been converted.

A 0.5% polymer concentration in water at pH 6.2 (NaOH) had a Brookfield viscosity of 29,600 cps.

Partial sodium salts of the resulting interpolymer were then prepared by addition of 15.0 grams polymer to 169 grams 0.5 N NaOH while mixing well in 1500 grams water. The pH of this mixture was 4.9. 530 grams where dried on a steam bath in a plastic tray and finally in a vacuum oven at $-28''$ Hg at 80° C. to a dry weight of 5.9 grams (A) to 1057 grams of above undried material was added 41.1 grams additional 0.5 N NaOH to a pH 7.0. 540 grams of this material were removed and dried as before. Dry weight 6.2 grams (B) to 540 grams remaining undried material was added 39.1 grams additional 0.5 N NaOH to a pH 8.9. This material was dried to 6.7 grams (C) all of the dried materials were each ground to powders and passed through a #100 U.S. sieve.

EXAMPLE 2

An interpolymer was prepared from the following ingredients:
 58.8 grams (0.6 mole) maleic anhydride
 1.7 grams (0.012 mole) butanediol divinyl ether
 0.6 grams (0.0018 mole) decanoyl peroxide
 353 grams (6.08 mole) methyl vinyl ether

Procedure

To a 1-liter magnadrive autoclave was charged 58.8 grams maleic anhydride, 1.7 grams butanediol divinyl ether and 0.5 grams decanoyl peroxide. The autoclave was purged three times with nitrogen by evacuation and release. The autoclave was finally evacuated and 353 grams methyl vinyl ether added and stirred for 15 minutes at ambient temperature. The reaction mixture was then heated to 45° C. over ½ hour then raised to 50° C. over ½ hour and held for 4 hours at 50°–56° C. and 40–64 psig. The stirring was then stopped and the excess methyl vinyl ether carefully vented for ½ hour. Vacuum was then applied until a negative pressure of $-28''$ Hg was reached at a temperature of 43° C.

74 grams of polymer powder were discharged. A test for unreacted maleic anhydride using triphenylphosphine paper showed that all maleic anhydride had been reacted.

0.5% polymer at pH 6.5 (NaOH) in 0.08% $Na_2SO_4$ had a Brookfield viscosity of 34,800 cps.

Partial potassium salts of the resulting interpolymers were then prepared by addition of 15.0 grams polymer to 140 grams approximately 0.5 N KOH while mixing well in 1500 grams water. The pH of this mixture was 5.0. 550 grams were dried on a steam bath in a plastic tray and finally in a vacuum oven at $-28''$ Hg and 80° C. to a dry weight of 6.8 grams (A). To 1102 grams of the above undried material remaining was added 46.0 grams 0.5 N KOH to a pH 7.0. 565 of this material was removed and dried as before. Dry weight 6.9 grams (B) to the 656 grams remaining undried material was added 37.0 gram 0.5 N KOH to a pH 9.0. This material was dried to 7.0 grams (C).

In order to evaluate the effectiveness of materials of the invention in absorbing aqueous fluids, the compositions of Examples 1 and 2 were tested by overnight exposure of 500 mg of polymer of the invention to an excess (200 grams) of simulated urine prepared by adding 58.2 grams USP urea, 1.8 grams anhydrous CP calcium chloride, 24 grams CP sodium chloride and 1.6 grams anhydrous CP magnesium sulfate to 2915 grams distilled water. The resulting slurry was then poured into a funnel filtered with fluted filter paper and filled with 100 grams of Ottawa sand. Pickup was determined gravimetrically. Materials of examples 1 and 2 prepared to a pH of 7.0 each absorbed 52 grams of urine per gram of polymer in this test.

While the invention has been described above with respect to preferred embodiments thereof, it will be understood by those skilled in the art that various changes and modifications may be made without departing from the spirit and scope of the invention.

What we claim is:

1. A water swellable but not water soluble composition consisting essentially of monovalent alkali metal salt of a crosslinked interpolymer consisting essentially of substantially equimolar quantities of maleic anhydride and a monovinyl alkyl ether wherein the alkyl group contains from 1 to 4 carbon atoms and from about 1 to about 5 mole percent, based on the monovinyl alkyl ether, of a crosslinking agent having a formula selected from the class consisting of:

$$H_2C=CH-O-X_1-OCH=CH_2$$

and $$H_2C=CH_2-(OX_2)_n-OCH=CH_2$$

where $X_1$ represents an alkylene group of two to twelve carbon atoms and $X_2$ represents an alkylene group of two to four carbon atoms and n represents an integer of 2 to 100.

2. Water swellable composition of claim 1 wherein the monovinyl alkyl ether is methyl vinyl ether.

3. Water swellable composition of claim 1 wherein the monovinyl ether is ethyl vinyl ether.

4. Water swellable composition of claim 1, wherein the crosslinking agent has the formula:

$$H_2C=CH-O-X_1-O-CH=CH_2$$

in which $X_1$ represents a butylene radical.

5. Water swellable composition of claim 1 wherein the crosslinking agent has the formula $$CH_2=CH(OX_2)_n-OCH=CH_2$$

in which $X_2$ is ethylene and n is 2.

6. Water swellable composition of claim 1 wherein the alkali metal is sodium.

7. Water swellable composition of claim 1 wherein the alkali metal is potassium.

8. Water swellable composition of claim 1 wherein the monovinyl alkyl ether is methyl vinyl ether, the alkali metal is sodium of potassium and the crosslinking agent has the formula:

$$H_2C=CH-O-X_1-O-CH=CH_2$$

in which $X_1$ represents a butylene radical.

9. Water swellable composition of claim 1 wherein the monovinyl alkyl ether is ethyl vinyl ether, the alkali metal is sodium or potassium and the crosslinking agent has the formula:

$$CH_2=CH(OX_2)_n-OCH=CH_2$$

in which $X_2$ is ethylene and n is 2.

* * * * *